A. G. DERSE.
REAR SIGHT FOR RIFLES.
APPLICATION FILED DEC. 17, 1915.
1,185,183.  Patented May 30, 1916.
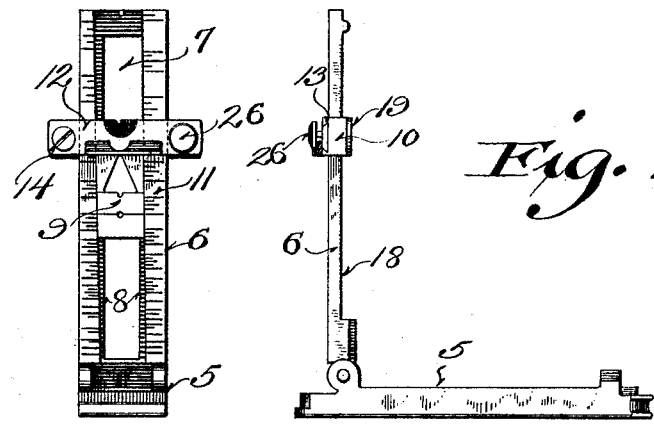
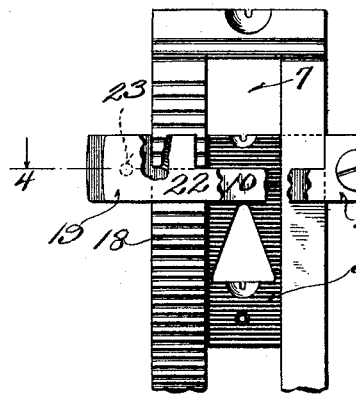
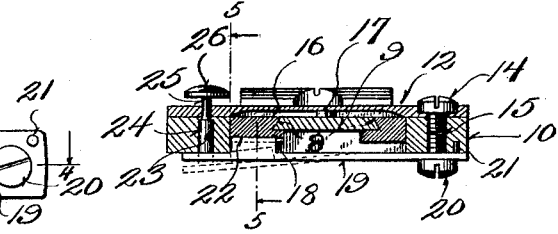
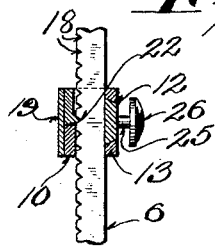
Inventor!
Anthony G Derse

UNITED STATES PATENT OFFICE.

ANTHONY G. DERSE, OF OCONOMOWOC, WISCONSIN.

REAR SIGHT FOR RIFLES.

1,185,183.     Specification of Letters Patent.     Patented May 30, 1916.

Application filed December 17, 1915. Serial No. 67,315.

*To all whom it may concern:*

Be it known that I, ANTHONY G. DERSE, a citizen of the United States, and resident of Oconomowoc, in the county of Waukesha and State of Wisconsin, have invented certain new and useful Improvements in Rear Sights for Rifles; and I do hereby declare that the following is a full, clear, and exact description thereof.
The present invention relates to new and useful improvements in rifle sights and is particularly directed to the provision of means for adjustably holding the slide members of sights of the general type of the model of 1905 rear sights used on United States army rifles.

It is primarily the object of the present invention to provide a holding means for the slide member which is instantly releasable to permit a quick manipulation of the slide member for adjustment to proper elevations, to thus supplant the usual thumb screw employed for holding the slide member.

It is further an object to provide a holding means for the slide member which is operable to hold the slide member only at points corresponding to respective indications of the leaf member whereby accuracy in positioning the member is assured.
A still further object resides in the provision of means for holding the slide member which may be embodied with the usual construction of the rear sight in a manner requiring but slight change thereof.
With the above and other objects and advantages in view, the invention resides more particularly in the novel combination, arrangement and formation of parts more particularly hereinafter described and particularly pointed out in the appended claims.

In the drawings, Figure 1 is a front elevational view of a rear sight member including an upstanding leaf portion. Fig. 2 is a side elevational view thereof. Fig. 3 is an enlarged rear elevational view of the upper portion of the leaf member, showing a slide positioned thereon with parts broken away in section to more clearly disclose the novel clamping means for the slide. Fig. 4 is a horizontal sectional view taken centrally through the slide and leaf member on the line 4—4 of Fig. 3. Fig. 5 is a vertical sectional view taken through the slide and leaf member on the line 5—5 of Fig. 4.
Referring now more particularly to the accompanying drawings, 5 designates the base of a rear sight of the general type embodied in the model of 1905 rear sight for United States army rifles. Upstanding from this base is the usual leaf member 6 which is provided with a longitudinal slot 7 and which has formed in its forward face the inclined dove tail recess 8 in which is slidably mounted the drift slide 9 provided with the usual sight openings. The usual slide member 10 is disposed transversely across the other face of the leaf and has its intermediate portion cut away to receive the sleeve whereby its forward face lies flush with the forward face of the leaf member which carries the usual series of graduations 11. This slide member is held on the leaf by a slide cap 12 which has one end secured by the ribs 13 formed on the forward face of one end of the slides and coacting to form a dove tail groove, the other end of the cap member is secured by a screw 14 passed through the cap and engaged in a threaded transverse bore 15 in the slide member. This cap is provided with the usual sight openings and has a longitudinal groove 16 in its inner face which receives a pin 17 carried by the drift slide whereby it is connected thereto in such manner as to procure the desired drift upon movement of the slide member. The foregoing is conventional structure.

The upper intermediate portion of the slide member is usually cut away to permit proper sighting with respect to the drift slide, and in the present instance, the entire upper intermediate portion of the drift slide is cut away to thus expose one of the sides of the rear face of the leaf, and the rear face of the leaf is provided at this side with a series of transverse grooves 18. To engage in these grooves to thus lock the slide member a spring pawl is provided which comprises a spring strip 19 which is secured at one end to the slide member by a screw 20 passed through the strip engaged in the bore 15, the strip being held from rotative movement on the screw by a pin 21 carried thereby and projecting into the slide. Adjacent its other end the spring strip carries a tooth 22 which engages selectively in one of the grooves 18. The slide member is thus normally locked on the leaf. To release the pawl for adjustment of the slide member, a pin 23 is disposed in a bore 24 provided transversely in the end of the slide adjacent the free end of the strip and this pin has a reduced extension 25 which extends through the cap and carries a button 26. A means has thus been provided for holding the slide member whereby it may be instantly released for manipulation to procure a proper positioning thereof. The pin 23 is held against displacement by abutment with the spring strip and with the cap member.

Each of the grooves 18 corresponds to a respective graduation 11 and thus accuracy in positioning the slide member is assured.

I claim:

1. In a sight, the combination with a leaf member provided with a series of grooves and a slide member, of a spring member secured at one end to the slide member and engageable at its free end selectively with said grooves and a pin slidably carried by the slide member for engagement with the free end of the spring member.

2. In a sight, the combination with a leaf member provided with a series of grooves, a slide member having a cutaway portion adjacent said grooves and a cap securing said slide member on the leaf, of a spring member carried longitudinally by the slide member for selective engagement with said grooves, a pin slidably passed transversely through the slide member for engagement with the spring member and a reduced extension on the pin passed through the cap.

In testimony that I claim the foregoing I have hereunto set my hand at Oconomowoc, in the county of Waukesha and State of Wisconsin, in the presence of two witnesses.

ANTHONY G. DERSE.

Witnesses:
  MARY BECKLEY,
  A. R. TOPPNOW.

Copies of this patent may be obtained for five cents each, by addressing the "Commissioner of Patents, Washington, D. C."